No. 606,993. Patented July 5, 1898.
C. F. JENKINS.
DEVICE FOR OBTAINING STEREOSCOPIC EFFECTS IN EXHIBITING PICTURES.
(Application filed June 19, 1897.)
(No Model.)
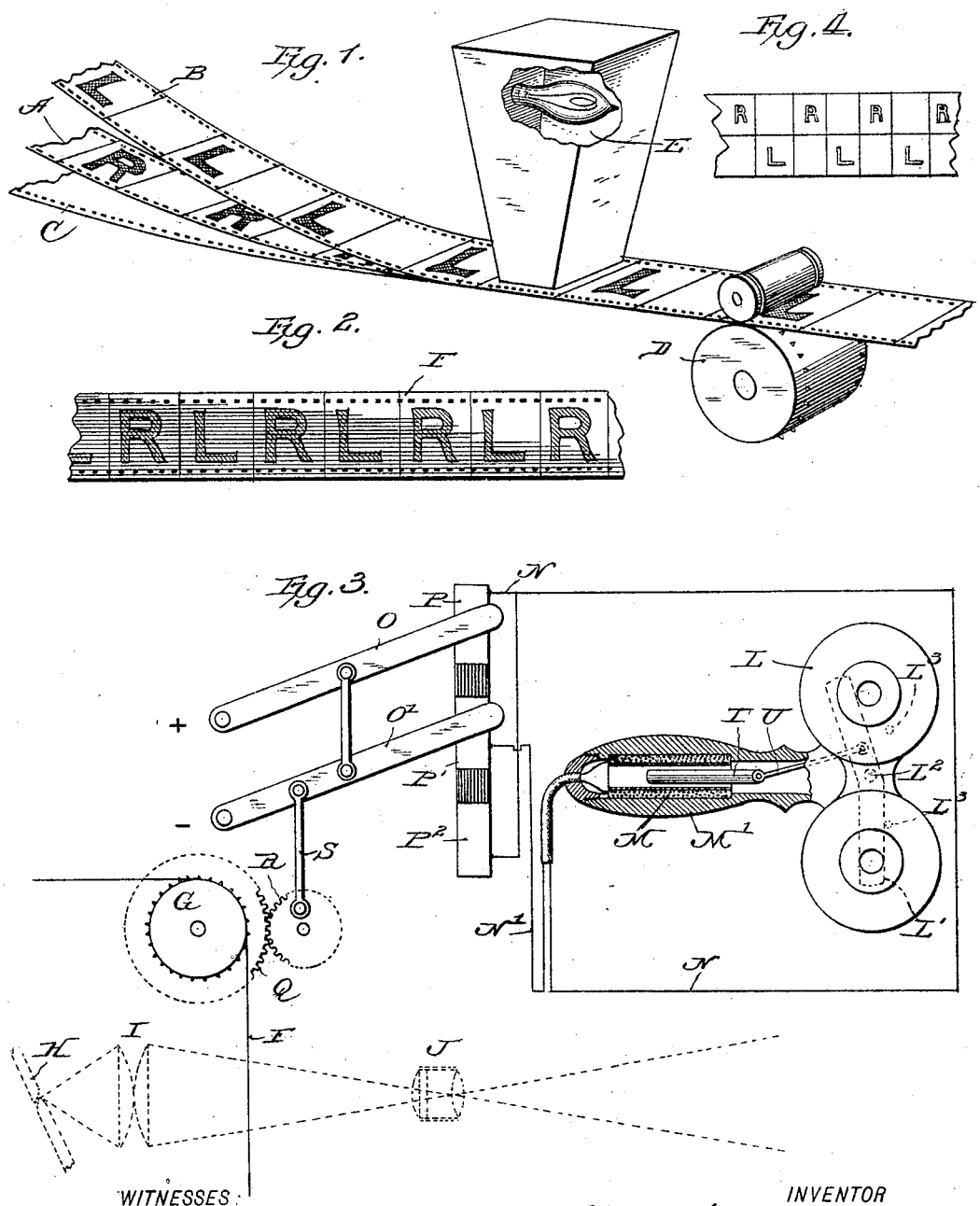

UNITED STATES PATENT OFFICE.

CHARLES FRANCIS JENKINS, OF WASHINGTON, DISTRICT OF COLUMBIA, ASSIGNOR OF ONE-HALF TO EMILE BERLINER, OF SAME PLACE.

DEVICE FOR OBTAINING STEREOSCOPIC EFFECTS IN EXHIBITING PICTURES.

SPECIFICATION forming part of Letters Patent No. 606,993, dated July 5, 1898.

Application filed June 19, 1897. Serial No. 641,455. (No model.)

*To all whom it may concern:*

Be it known that I, CHARLES FRANCIS JENKINS, a citizen of the United States, residing at Washington, District of Columbia, have invented certain new and useful Improvements in Devices for Obtaining Stereoscopic Effects in Exhibiting Pictures; and I do hereby declare the following to be a full, clear, and exact description of the invention, such as will enable others skilled in the art to which it appertains to make and use the same.

The object of this invention is to provide means whereby the observer in looking at series pictures showing objects in motion may see the objects in such relief as is given by a stereoscope. For illustration I have selected devices that permit pictures thrown upon a screen to be so seen simultaneously by each individual of an assembly; but many other embodiments of the invention are obviously possible.

A common stereoscope uses a pair of pictures showing the object as seen from two points whose separation is approximately equal to that of the right and left eyes, and pictures analogous to the pictures of such a pair are herein designated as "right" pictures and "left" pictures. Apparatus in accordance with this invention exhibits to the right eye in rapid succession a series of right pictures of a moving object and during such exhibition exhibits to the left eye an approximately corresponding series of left pictures, whereby the object is perceived in relief and in motion. The two sets of pictures may be made up of pairs of synchronously-taken right and left pictures, and these may be simultaneously exhibited to the right and left eyes, respectively. Neither condition is indispensable, however, and with the apparatus illustrated the impressions upon the two retinas are made alternately. Preferably the two series of pictures are combined upon an ordinary strip or film, and under ordinary inspection neither the strip nor the pictures when projected are noticeably different from the ordinary film and pictures, although this film bears alternating right and left pictures; but if the projected pictures be viewed with the aid of devices that allow only the right-eye pictures to be seen by the right eye and the left-eye pictures by the left eye the moving object is seen in full stereoscopic relief.

In the drawings, Figure 1 shows the means for obtaining a strip having in the same line alternating right and left pictures. Fig. 2 shows a portion of such strip. Fig. 3 is a partly-diagrammatic plan showing the projecting devices, the observing devices, and the connections whereby movements of the first cause synchronous movements in the second. Fig. 4 shows a modified strip.

In Fig. 1, A and B are film-strips bearing only right pictures and left pictures, respectively, and each having its pictures approximately a picture's width apart. These strips are so superposed that the pictures of each register with the spaces between the pictures of the other, and the three are then fed forward, preferably by a sprocket-drum D, whose teeth engage in registering perforations in the three beneath a beam of light at E, and thus both sets are printed upon the third strip, which, being properly developed, becomes the strip F ready for use. The strip F is placed in a suitable projecting apparatus, which may consist of a drum G for feeding the strip, a source of light H, a condenser I, a projecting lens J, and suitable devices (not shown) for operating the drum and insuring the placing of successive pictures accurately in the projecting beam of light at exactly the proper intervals. The projected pictures may be viewed through an opera-glass L or any binocular eyepiece adapted for supporting devices for alternately interrupting the lines of vision from the two eyes. As shown, the device L is provided with a shutter L', pivoted at L² and limited in movement by stops L³. The shutter is swung back and forth on its pivot synchronously with the advance of the pictures into the path of the beam of projecting light in such manner that while a left picture is on the screen the view by the right eye is cut off, and vice versa. To accomplish this result, a solenoid M is mounted in the handle M' of the opera-glass and connected with any convenient source of current by wires N N' and a simple current-reversing device. This is shown as consisting of two pivoted conducting-bars O O', insulated from each other, but connected to swing together over conductingblocks P P' P², of which the first and last are connected with the wire N, while the other is connected with the wire N'. By means of a gear Q, moving with the drum G, a meshing pinion R, and a link S the drum in rotating so far as to advance the strip a picture's width swings both the bars O O' from the blocks upon which they rest, respectively, to the adjacent blocks, and thus reverses the current in the solenoid. Such reversal either draws inward or pushes outward a magnetized steel core T, connected by a link U to the shutter, and thereby swings the latter out of the line of sight of one eye and into the line of sight of the other. If then the view of the right eye, for example, be unobstructed and if the film be so placed that a right picture is projected, thereafter the whole series of pictures will be exhibited synchronously with the changes of the shutter, and the right and left eyes will see only right and left pictures, respectively, until the whole series has passed through the projecting beam.

Obviously the number of devices L is unlimited, and the conducting-wires merely replace the usual chain by which coin-freed opera-glasses are ordinarily secured to opera-chairs in public halls.

It is also plain that the construction may be widely varied within the limits of my invention, and I do not therefore wish to confine myself to the specific forms set forth. For example, I have shown in Fig. 4 the spaced left pictures alined alongside the spaced right pictures and upon the same strip, this being a form usable with an easily-made modification of the other devices shown.

What I claim is—

1. A series-picture strip bearing alternating right and left pictures of the same object.

2. A series-picture strip bearing in alinement alternating right and left stereoscopic pictures.

3. The method of printing a series-stereoscopic-picture strip by superposing right and left stereoscopic series negatives upon a sensitive blank strip in position to print both series in alternating succession upon said blank.

4. A series-stereoscopic-picture negative on which alined pictures all adapted to be viewed by the same eye alternate with blank spaces in width approximately equal to said pictures.

5. The combination with projecting devices, of means for advancing a series-picture strip therefor, a binocular eyepiece, a shutter adapted to alternately obstruct the lines of sight through said eyepiece, a solenoid arranged to actuate said shutter, conductors leading from said mechanism to said solenoid, and means whereby the movements of said mechanism control the current in said conductors.

In testimony whereof I affix my signature in presence of two witnesses.

C. FRANCIS JENKINS.

Witnesses:
HUGH M. STERLING,
WALLACE GREENE.